United States Patent [19]

Umeda et al.

[11] Patent Number: 5,391,600
[45] Date of Patent: Feb. 21, 1995

[54] POLYCARBONATE RESIN COMPOSITION

[75] Inventors: Takashi Umeda; Kazuto Hashimoto; Kouji Satou; Haruhiko Furukawa, all of Ichihara, Japan

[73] Assignees: Idemitsu Petrochemical Co., Ltd.; Dow Corning Toray Silicone Company, Ltd., both of Tokyo, Japan

[21] Appl. No.: 138,757

[22] Filed: Oct. 18, 1993

[30] Foreign Application Priority Data

Oct. 26, 1992 [JP] Japan .................. 4-286529

[51] Int. Cl.$^6$ .................. C08J 5/10; C08K 5/54; C08L 69/00
[52] U.S. Cl. .................. 524/267; 524/425; 524/430; 524/449; 524/451; 524/537; 524/547; 524/588; 525/67; 525/146; 525/439; 525/478; 523/212
[58] Field of Search .................. 524/425, 430, 449, 451, 524/537, 547, 588, 267; 525/67, 146, 439, 478; 523/212

[56] References Cited

U.S. PATENT DOCUMENTS

| | | | |
|---|---|---|---|
| 4,197,384 | 4/1980 | Bialous, deceased, et al. | 525/464 |
| 4,657,973 | 4/1987 | Endo et al. | 525/67 |
| 5,025,066 | 6/1991 | DeRudder et al. | 525/66 |

FOREIGN PATENT DOCUMENTS

| | | |
|---|---|---|
| 0105090 | 4/1984 | European Pat. Off. |
| 0550168 | 7/1993 | European Pat. Off. |
| 2413437 | 7/1979 | France |
| WO80/00708 | 4/1980 | WIPO |

*Primary Examiner*—Paul R. Michl
*Assistant Examiner*—U. K. Rajguru
*Attorney, Agent, or Firm*—Frishauf, Holtz, Goodman & Woodward

[57] ABSTRACT

A polycarbonate resin comprising (A) a thermoplastic resin comprising a polycarbonate resin as the main component thereof, (B) inorganic fillers and/or inorganic pigments and (C) an organopolysiloxane having an organoxysilyl group which is bonded to a silicon atom through a divalent hydrocarbon group is provided. The polycarbonate resin shows a lesser degree of molecular weight decrease, has excellent heat stability and moldability, and provides molded articles having excellent appearance, mechanical properties like impact resistance, degree of whiteness and color tone. The polycarbonate resin can be applied to production of various kinds of molded articles, such as molded articles in the field of office automation instruments, electric and electronic products, automobiles, mechanical products, building materials and the like.

17 Claims, No Drawings

POLYCARBONATE RESIN COMPOSITION

BACKGROUND OF THE INVENTION

1. Field of the Invention

The present invention relates to a novel polycarbonate resin composition. More particularly, the present invention relates to a novel polycarbonate resin composition showing a lesser degree of molecular weight decrease which is accompanied with compounding of inorganic fillers or inorganic pigments to a polycarbonate resin. It also relates to a novel polycarbonate resin composition having excellent moldability and providing molded articles having excellent appearance, mechanical properties, such as impact resistance, bending modulus and the like, and degree of whiteness.

2. Description of the Related Art

Polycarbonate resins have excellent mechanical strength, particularly impact strength, electric properties, transparency and the like and have been widely applied as engineering plastics in various fields, such as electric and electronic instruments, automobiles and the like.

When the polycarbonate resins having the properties described above are used as exterior materials of automobiles and the like, they are generally modified with inorganic fillers or inorganic pigments. The following examples can be mentioned as the polycarbonate resin modified with inorganic fillers or inorganic pigments: a material in which an inorganic filler is added and stiffness is increased while the appearance is kept excellent; a material in which an inorganic filler is added and the coefficient of linear expansion is decreased while the appearance is kept excellent; a material which is colored by addition of an inorganic pigment; a material in which an inorganic filler or an inorganic pigment is added and solvent resistance and impact resistance are improved by further addition of thermoplastic polyester resins or rubbery elastomers; and the like materials.

For the material in which an inorganic filler is added and stiffness is increased while appearance is kept excellent and the material in which an inorganic filler is added and coefficient of linear expansion is decreased while the appearance is kept excellent, talc, mica, potassium titanate whisker or the like is used recently in place of glass fiber which has heretofore been used.

However, when an inorganic filler or an inorganic pigment is compounded with a polycarbonate resin, problems arise that molecular weight of the polycarbonate is decreased significantly, that impact resistance is also decreased significantly to cause deterioration of characteristic properties of polycarbonate resin and that heat stability of the resin in a molding apparatus is diminished by the decrease of molecular weight.

As the inorganic coloring pigment for white colored articles, white pigments, such as zinc sulfide, zinc oxide, titanium oxide and the like, are used. For example, when titanium oxide which is the representative white pigment among them is compounded with a polycarbonate resin, another problem arises that degree of whiteness is decreased in addition to the decrease of heat stability in a molding apparatus by the decrease of molecular weight.

For the purpose of solving the problems, for example, a polycarbonate resin system comprising inorganic pigments (mainly titanium oxide) and an antioxidant [tetrakis(2,4-di-tert-butylphenyl)-biphenylene diphosphonite] was utilized in a technology disclosed in Japanese Patent Application Laid Open No. 1982-151644 with the object of improving the heat stability during molding (improving degree of whiteness and decrease of color change).

However, the effect of improvement of the heat stability of the system containing a white pigment by the disclosed technology is insufficient.

Coloring materials of inorganic pigments have a problem that hydrolysis of a polycarbonate occurs and molecular weight is decreased when the system is made alkaline or acidic, particularly alkaline, by the presence of the pigments, because polycarbonate resins have carbonic acid ester linkages in the molecule.

The material in which an inorganic filler or an inorganic pigment is added and solvent resistance and impact resistance are improved by the addition of thermoplastic polyester resins or rubbery elastomers has a problem that the system is made alkaline or acidic when an active group, such as the active hydroxyl group, is present on the surface of the inorganic filler. This condition causes decomposition of the polycarbonate resin, accelerates deterioration of physical properties and decreases stability of the process.

Extensive studies were undertaken by the present inventors to develop a polycarbonate resin composition which can suppress decrease of molecular weight of the polycarbonate and has excellent solvent resistance, impact resistance and degree of whiteness by solving the problems described above.

As the result of such studies, it was discovered that a polycarbonate resin composition providing molded products having the desired properties can be obtained by compounding an organopolysiloxane having an organoxysilyl group together with an inorganic filler or an inorganic pigment, or, according to desire, a polyester resin and a rubbery elastomer, into a polycarbonate resin. The present invention was completed on the basis of the discovery.

SUMMARY OF THE INVENTION

Thus, the present invention provides a polycarbonate resin composition comprising 100 weight parts of (A) a thermoplastic resin comprising a polycarbonate resin as the main component thereof, 0.001 to 50 weight parts of (B) at least one kind selected from the group consisting of inorganic fillers and inorganic pigments and 0.001 to 5 weight parts of (C) an organopolysiloxane having an organoxysilyl group which is bonded to a silicon atom through a divalent hydrocarbon group.

DESCRIPTION OF PREFERRED EMBODIMENT

Various polycarbonate resins can be used as the polycarbonate resin (PC) which is the main component of the thermoplastic resin of the component (A) constituting the resin composition of the present invention. However, it is preferred that the polycarbonate resin is a polymer comprising the repeating unit expressed by the general formula (I):

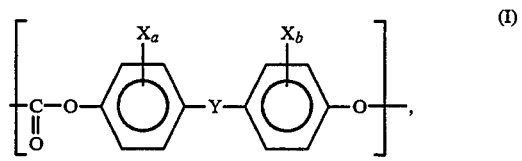

wherein X is a halogen atom, such as a chlorine atom, a bromine atom, a fluorine atom and an iodine atom, or an alkyl group having 1 to 8 carbon atoms, such as methyl group, ethyl group, propyl group, n-butyl group, isobutyl group, amyl group, isoamyl group, hexyl group, octyl group and the like; a plural of X may be the same or different from each other when the plural of X are contained; a and b are, respectively, an integer of 0 to 4; and Y is a single bond, an alkylene group having 1 to 8 carbon atoms, such as methylene group, ethylene group, propylene group, butylene group, pentenylene group, hexylene group, octylene group, and the like, an alkylidene group having 2 to 8 carbon atoms, such as ethylidene group, isopropylidene group and the like, a cycloalkylene group having 5 to 15 carbon atoms, such as cyclopentylene group, cyclohexylene group and the like, a cycloalkylidene group having 5 to 15 carbon atoms, such as cyclopentylidene group, cyclohexylidene group and the like, —S—, —SO—, —SO$_2$—, —O—, —CO— or a bond expressed by the general formula (II) or (II'):

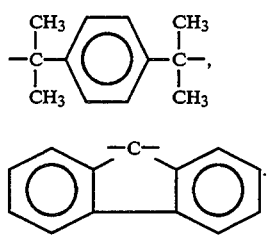

The polycarbonate resin described above can be obtained from various sources. In general, the polycarbonate resin can be prepared easily by the reaction of a dihydric phenol expressed by the general formula (III):

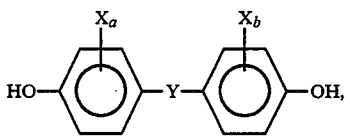

wherein X, a, b and Y are the same as described above, with phosgen or a carbonic acid diester compound.

For example, the polycarbonate resin can be prepared by the reaction of a dihydric phenol and a carbonate precursor like phosgen in a solvent like methylene chloride in the presence of a. generally known acid acceptor or a generally known molecular weight modifier by the interfacial polycondensation reaction. The polycarbonate resin can also be prepared by transesterification of a dihydric phenol and a carbonate precursor like diphenyl carbonate.

Various compounds can be used as the dihydric phenol expressed by the general formula (III) described above. Particularly, 2,2-bis(4-hydroxyphenyl)propane [bisphenol A] is preferable as the dihydric phenol. Other examples of the dihydric phenol are: bis(4-hydroxyphenyl)alkanes other than bisphenol A, such as 1,1-(4-hydroxyphenyl)methane, 1,1-(4-hydroxyphenyl)ethane and the like; 4,4'-dihydroxydiphenyl; bis(4-hydroxyphenyl)cycloalkanes; bis(4-hydroxyphenyl)oxide; bis(4-hydroxyphenyl)sulfide; bis(4-hydroxyphenyl)sulfone; bis(4-hydroxyphenyl)sulfoxide; bis(4-hydroxyphenyl)ether; bis(4-hydroxyphenyl)ketone; and halogenated bisphenols, such as bis(3,5-dibromo-4-hydroxyphenyl)propane, bis(3,5-dichloro-4-hydroxyphenyl)propane and the like. As dihydric phenol other than those described above, for example, hydroquinone and the like can be used.

The dihydric phenol may be used singly or as a combination of two or more kinds.

Examples of the carbonic acid diester compound are diaryl carbonates, such as diphenyl carbonate and the like, and dialkyl carbonates, such as dimethyl carbonate, diethyl carbonate and the like.

Any kind of generally used molecular weight modifier can be used in the present invention. Examples of the molecular weight modifier are aromatic phenols, such as phenol, p-tert-butylphenol, p-cumylphenol, p-tert-octylphenol, tribromophenol and the like, aliphatic alcohols, such as methanol, butanol and the like, mercaptanes, phthalimide and the like.

The polycarbonate .resin may be a homopolymer prepared by using a single kind of the dihydric phenol described above, a copolymer prepared by using two or more kinds of the dihydric phenol or a thermoplastic random branched polycarbonate resin prepared by using a polyfunctional aromatic compound in addition to the dihydric phenol described above.

The polycarbonate resin may be a polycarbonate-polyorganosiloxane copolymer containing organosiloxane block having the number average degree of polymerization of 5 or more. The polycarbonate resin may also be a mixture of two or more kinds of the polycarbonate resins described above.

The polycarbonate resin used in the present invention preferably has a viscosity average molecular weight in the range of 10,000 to 100,000 and more preferably in the range of 15,000 to 40,000, so that the resin acquires satisfactory mechanical strength and moldability.

For the purpose of improvement of solvent resistance and impact resistance, an aromatic polyester resin and, according to desire, a rubbery elastomer may be used in addition to the polycarbonate resin as the thermoplastic resin of the component (A).

Various resins can be used as the aromatic polyester resin described above. The particularly preferred example is a polyester resin obtained by polymerization of a difunctional carboxylic acid and an alkylene glycol.

Examples of the difunctional carboxylic acid described above are aromatic carboxylic acids, such as terephthalic acid, isophthalic acid, naphthalene dicarboxylic acid and the like. Terephthalic acid is preferable among them. Other difunctional carboxylic acids may be used together with terephthalic acid within the range that they do not show adverse influence on the effect of the present invention. Examples of the other difunctional carboxylic acid are aliphatic carboxylic acids, such as oxalic acid, malonic acid, adipic acid, suberic acid, azelaic acid, sebacic acid, decanedicarboxylic acid and the like, and derivatives thereof which can form esters. In general, amount of the other difunctional carboxylic acid used is preferably 20 mol % or less of the total dicarboxylic acid.

The alkylene glycol described above is not particularly limited. Examples of the alkylene glycol are aliphatic diols having 2 to 15 carbon atoms, such as ethylene glycol, propylene-1,2-glycol, propylene-1,3-glycol, butylene-1,4-glycol, butylene-2,3-glycol, hexane-1,6-diol, octane-1,8-diol, neopentyl glycol, decane-1,10-diol and the like, polyethylene glycols and the like. Two or more kinds of the glycol may be copolymerized.

As the polyester resin obtained by the polymerization of difunctional carboxylic acid and the alkylene glycol, polyethylene terephthalate (PET) and polybutylene terephthalate (PBT) are particularly preferable.

The aromatic polyester resin can be prepared by a conventional method in the presence or in the absence of a polycondensation catalyst containing titanium, germanium, antimony or the like. For example, polyethylene terephthalate is generally prepared by the first stage reaction in which a glycol ester of terephthalic acid and/or an oligomer of the ester is prepared by esterification reaction of terephthalic acid and ethylene glycol or by transesterification of a lower alkyl ester of terephthalic acid, such as dimethyl terephthalate, and ethylene glycol; followed by the second stage reaction called polymerization in which the glycol ester and/or the oligomer is further polymerized to form a polymer of a higher degree of polymerization.

Various elastomers can be used as the rubbery elastomer described above. Preferable examples are copolymers obtained by polymerizing one or more kinds of vinyl monomer in the presence of a rubbery polymer.

Examples of the rubbery elastomer are copolymers comprising one or more kinds of acrylic copolymer or methacrylic copolymer containing an alkyl acrylate or an alkyl methacrylate as the main component thereof, a diene polymer containing a conjugated diene, such as butadiene, isoprene and the like, as the main component thereof and a silicone polymer containing polyorganosiloxane as the main component thereof. They are resins generally called MAS resin, MBS resin, MABS resin or the like.

Examples of the vinyl monomer are aromatic vinyl compounds, such as styrene, α-methylstyrene and the like, acrylic esters, such as methyl acrylate, ethyl acrylate and the like, methacrylic esters, such as methyl methacrylate, ethyl methacrylate and the like, cyanovinyl compounds, such as acrylonitrile and the like, and the like monomers.

As the rubbery elastomer, generally known elastomers, such as those disclosed in Japanese Patent Publication 1973-29308 (an MAS resin), Japanese Patent Publication 1980-9435 (an MBS resin), Japanese Patent Application Laid Open No. 1989-6051 (an MAIS resin) and Japanese Patent Application Laid Open No. 1989-79257, can be used, as well.

The generally known rubbery elastomers are commercially readily available. Examples of the commercial rubbery elastomer are Paralloid KM330 (a product of Rohm & Haas Co.; an MAS resin), Metablen C-223 (a product of Mitsubishi Rayon Co., Ltd.; an MBS resin), Metablen S-2001 (a product of Mitsubishi Rayon Co., Ltd.; an MAS resin) and the like.

Rubbery elastomers other than those described above, such as butadiene rubber (BR), styrene-butadiene rubber (SBR), isobutylene-isoprene rubber (IIR), ethylene-propylene rubber (EPR), ethylene-propylene-diene rubber (EPDM), acrylonitrile-butadiene rubber NBR), styrene-butadiene-styrene rubber (SBS), hydrogenation products of styrene-butadiene rubber (SEBS), styrene-isoprene-styrene rubber (SIS), hydrogenation products of styrene-isoprene rubber (SEPS) and the like, can be used, as well.

Further, a polyamide resin, such as nylon 6, nylon 66 and the like, a polyacrylate resin, an ABS resin or an AS resin may be compounded with the polycarbonate resin singly or as a mixture of two or more kinds thereof and served as the component (A).

Various materials can be used as the inorganic filler which is one of the component (B) constituting the resin composition of the present invention. Fillers containing a group reactive with the polycarbonate resin of the main component of the component (A) are preferable. In general, inorganic fillers tend to adsorb water and contain the hydroxyl group which is reactive with the polycarbonate resin.

As the filler containing the group reactive with the polycarbonate resin of the main component of the component (A) in the present invention, various kinds of conventional inorganic filler can be used. Examples of this kind of inorganic filler are fiber fillers, such as potassium titanate whisker, mineral fibers like rock wool, glass fiber, carbon fiber, metal fiber like stainless steel fiber, aluminum borate whisker, silicon nitride whisker, boron fiber, zinc oxide whisker of "tetrapod"-shape and the like.

Other examples of the inorganic filler are plate-form fillers, such as talc, mica, acid treated talc, acid treated mica, pearl mica, glass flake (amorphous), aluminum foil and the like, and particulate fillers, such as calcium carbonate, glass beads, glass balloons, carbon black (particulate), glass powder (amorphous) and the like.

Among these inorganic fillers, ultra-fine fiber fillers having a diameter of 1 $\mu$m or less, such as potassium titanate whisker, aluminum borate whisker and the like, and ultra-fine fillers having a longer diameter of 20 $\mu$m or less, such as talc, mica, calcium carbonate and the like, are preferably used because of superior smoothness of the surface.

Various pigments can be used as the white pigment of the inorganic filler of the component (B).

More specifically, titanium oxide, zinc oxide, lithopone, zinc sulfate, lead white and the like are preferably used. Among them, titanium oxide having excellent coloring ability is preferable. Any of the ruffle type titanium oxide and the anatase type titanium oxide can be used as titanium oxide. However, the rutile type titanium oxide having superior heat stability and weatherability is preferably used. Titanium oxide is more effectively applied when the surface of the particles is treated and coated with a surface treatment agent of various kind. Hydrated aluminum, silica, zinc or the like is generally used as the surface treatment agent.

For improvement of dispersion of titanium oxide in the resin composition, silicone oil, polyol or the like may be used.

An inorganic filler of the component (B) other than the white pigment described above, for example, one or more kinds selected from iron oxide, ultramarine blue, pearl mica, carbon black, conductive carbon black, calcium carbonate, molybdenum red, yellow lead, alumina, zinc chromate, chromium oxide, copper phthalocyanine (phthalocyanine blue), mineral violet, cobalt blue, cobalt violet and the like, can be used, as well.

Among them, iron oxide, ultramarine blue, pearl mica, carbon black and calcium carbonate are preferably used.

The iron oxide is a reddish brown pigment containing iron dioxide as the main component and generally called red oxide. The iron oxide shows a color tone varying in the wide range of orange red to purple depending on the diameter of the particles and a desired color tone can be selected.

The ultramarine blue is a clear blue pigment composed of silica, alumina, sodium oxide and sulfur. It is mainly produced by synthetic methods. Depending on the size of the particles, bluish ultramarine blue and reddish ultramarin blue are produced.

A pearl pigment which is artificially made from mica to exhibit the pearl gloss can be used as the pearl mica. The pearl pigment is prepared by treating and coating the surface of natural mica with a metal oxide having high refractive index, such as titanium oxide, iron oxide and a mixture of titanium oxide and iron oxide. A specific part of the rainbow color spectrum can be emphasized by adjusting the thickness of the coating layer of the metal oxide. Commercially readily available pigments, such as Iriodin produced by Merk Corporation, can be used as the pearl pigment.

Carbon black can be used as the black pigment. Quality of the carbon black is varied depending on size (particle diameter and specific surface area), structure and chemical nature of surface of the particles. Various grades of carbon black, ranging from excellent grades having a small particle diameter, a large specific surface area and, hence, excellent coloring ability to other grades, are commercially available.

Calcium carbonate is classified into natural calcium carbonate (calcium carbonate heavy) and synthetic calcium carbonate (precipitated calcium carbonate). Any of these kinds of calcium carbonate can be used. Micro-particulate calcium carbonate having most of the particle diameter in the range of 10 μm or less is used as the pigment. Size, aggregation and dispersion of the particles are important factors for using calcium carbonate.

The resin composition of the present invention comprises an organopolysiloxane having an organoxysilyl group which is bonded to a silicon atom through a divalent hydrocarbon group as the component (C) (abbreviated as Organopolysiloxane) in addition to the components (A) and (B) described above. Organopolysiloxane has the function of suppressing the decrease of molecular weight of the polycarbonate resin which is the main component of the component (A) and maintaining impact resistance and heat stability of the polycarbonate at satisfactory levels. Therefore, Organopolysiloxane is the essential component of the resin composition of the present invention.

Various compounds can be used as Organopolysiloxane of the component (C). Specifically, a linear, cyclic, net form or partially branched linear organopolysiloxane having an organoxysilyl group which is bonded to a silicon atom through a divalent hydrocarbon group can be used. A linear organopolysiloxane having an organoxysilyl group bonded to a silicon atom through a divalent hydrocarbon group is particularly preferable.

Examples of the organopolysiloxane having an organoxysilyl group bonded to a silicon atom through a divalent hydrocarbon group are the linear organopolysiloxanes expressed by the general formula (IV):

(IV)

wherein $R^1$ is a monovalent hydrocarbon group, A is a monovalent hydrocarbon group or a monovalent hydrocarbon group having an organoxysilyl group expressed by the general formula (V):

(V)

($R^2$ is a divalent hydrocarbon group, $R^3$ and $R^4$ are each, a mono-valent hydrocarbon group and x is an integer of 0 to 2), at least one of A is a monovalent hydrocarbon group comprising the organoxysilyl group, m is an integer of 1 to 300, n is an integer of 0 to 300 and m+n is an integer of 1 to 300.

Examples of the monovalent hydrocarbon group shown by $R^1$ in the general formula (IV) are: alkyl groups, such as methyl group, ethyl group, propyl group, butyl group, pentyl group, hexyl group and the like; alkenyl groups, such as vinyl group, allyl group, butenyl group, pentenyl group, hexenyl group and the like; aryl groups, such as phenyl group, tolyl group, xylyl group and the like; aralkyl groups, such as benzyl group, phenetyl group and the like; and substituted alkyl groups, such as chloromethyl group, chloropropyl group, 3,3,3-trifluoropropyl group and the like. Examples of the monovalent hydrocarbon shown by A are the same as those described above.

Examples of the divalent hydrocarbon group shown by $R^2$ in the general formula (V) are alkylene groups, such as methylmethylene group, ethylene group, methylethylene group, propylene group, butylene group and the like. Examples of the monovalent hydrocarbon group shown by $R^3$ or $R^4$ are the same as those described above. Examples of the monovalent hydrocarbon group comprising an organoxysilyl group are trimethoxysilylethylene group, triethoxysilylethylene group, dimethoxyphenoxysilylpropoylene group, trimethoxysilylpropylene group, trimethoxysilylbutylene group, methyldimethoxysilylpropylene group, dimethylmethoxysilylpropylene group and the like.

Molecular weight of the component (C) is not particularly limited. It is preferred that, in the general formula (IV), m is an integer of 1 to 300, n is an integer of 0 to 300 and m+n is an integer of 1 to 300 because the decrease of the molecular weight of the polycarbonate resin in the resin composition of the present invention can be suppressed.

Organosiloxane of the component (C) can be obtained by various methods. For example, it can be prepared by addition reaction between an organopolysiloxane having a hydrogen atom bonded to a silicon atom and a hydrocarbon having an organoxysilyl group and an aliphatic unsaturated hydrocarbon linkage in the presence of a platinum catalyst. It can also be prepared by addition reaction between an organo-polysiloxane having a hydrocarbon group having an aliphatic unsaturated hydrocarbon linkage and an organoxysilane having a hydrogen atom bonded to a silicon atom in the presence of a platinum catalyst.

The resin composition of the present invention comprises the components (A), (B) and (C) in the amounts shown in the following.

The resin composition of the present invention comprises 100 weight parts of (A) the thermoplastic resin comprising the polycarbonate resin as the main component thereof, 0.001 to 50 weight parts of (B) the inorganic fillers and/or the inorganic pigments and 0.001 to 5 weight parts of (C) the organopolysiloxane having an organoxysilyl group which is bonded to a silicon atom through a divalent hydrocarbon group.

In the present invention, amounts of the components in the resin compositions may be different depending on the kinds of the adopted components as shown in the following.

When a white pigment is used as the inorganic pigment of the component (B), the resin composition comprises 0.01 to 20 weight parts, preferably 0.1 to 15 weight parts, of the white pigment of the component (B) and 0.001 to 5 weight parts, preferably 0.01 to 3 weight parts, of the organopolysiloxane of the component (C) based on 100 weight parts of the thermoplastic resin of the component (A) comprising the polycarbonate resin as the main component thereof.

When the amount of the component (B) is less than 0.01 weight parts, sufficient degree of whiteness cannot be obtained. When the amount of the component (B) is more than 20 weight parts, the degree of whiteness is not increased as expected from the amount even though specific gravity is increased and no necessity to used an amount of more than 20 weight parts is found. When the amount of the component (C) is less than 0.001 weight parts, the effect of suppressing the decrease of molecular weight of the polycarbonate is small. When the amount of the component (C) is more than 5 weight parts, the polycarbonate resin composition slides over the screw during the mixing and feeding of the resin becomes unstable. Furthermore, mechanical properties, such as strength and stiffness, may be decreased. Thus, amounts out of the specified ranges are not preferable.

When an inorganic filler is used as the component (B) in the resin composition of the present invention, the resin composition comprises 0.01 to 50 weight parts, preferably 0.1 to 45 weight parts, of the inorganic filler of the component (B) and 0.001 to 5 weight parts, preferably 0.01 to 3 weight parts, of the organopolysiloxane of the component (C) based on 100 weight parts of the thermoplastic resin of the component (A) comprising the polycarbonate resin as the main component thereof.

When the amount of the component (B) is less than 0.01 weight parts, stiffness is not sufficiently increased. When the amount of the component (B) is more than 50 weight parts, specific gravity is increased and appearance is inferior. Thus, amounts out of the specified range are not preferable. When the amount of the component (C) is less than 0.01 weight parts, the effect of suppressing the decrease of molecular weight of the polycarbonate is small. When the amount of the component (C) is more than 5 weight parts, the polycarbonate resin composition slides over the screw during the mixing and feeding of the resin becomes unstable. Furthermore, mechanical properties, such as strength and stiffness, may be decreased. Thus, amounts out of the specified range are not preferable.

When an inorganic pigment other than the white pigment is used in the resin composition of the present invention, the resin composition comprises 0.001 to 20 weight parts, preferably 0.005 to 15 weight parts, of the inorganic filler of the component (B) and 0.001 to 5 weight parts, preferably 0.01 to 3 weight parts, of the organopolysiloxane of the component (C) based on 100 weight parts of the thermoplastic resin of the component (A) comprising the polycarbonate resin as the main component thereof.

When the amount of the component (B) is less than 0.001 weight parts, the desired color tone is hardly obtained. When the amount is more than 20 weight parts, the amount is more than necessary for obtaining the desired color tone and mechanical properties are decreased. Thus, amounts out of the specified range are not preferable. When the amount of the component (C) is less than 0.001 weight parts, the effect of suppressing the decrease of molecular weight of the polycarbonate is small. When the amount of the component (C) is more than 5 weight parts, the polycarbonate resin composition slides over the screw during the mixing and feeding of the resin becomes unstable. Furthermore, mechanical properties, such as strength and stiffness, may be decreased. Thus, amounts out of the specified range are not preferable.

It is necessary for maintaining the physical properties, such as impact strength, heat resistance and the like, at a satisfactory level that the thermoplastic resin of the component (A) comprises at least 40 weight % or more, preferably 50 weight % or more, of the polycarbonate resin as the main component thereof.

When the polycarbonate resin, a thermoplastic polyester resin and a rubbery elastomer are used as the component (A) and an inorganic filler or an inorganic pigment is used as the component (B) of the resin composition of the present invention, the component (A) comprises 50 to 95 weight %, preferably 55 to 90 weight %, of the polycarbonate resin as the main component thereof, 5 to 50 weight %, preferably 10 to 45 weight %, of the thermoplastic polyester resin and 0 to 45 weight %, preferably 0 to 40 weight %, of the rubbery elastomer. The resin composition also comprises 0.01 to 50 weight parts, preferably 0.05 to 20 weight parts, of the inorganic filler or the inorganic pigment of the component (B) and 0.001 to 5 weight parts, preferably 0.005 to 2 weight parts, of the organopolysiloxane of the component (C) based on 100 weight parts of the total of the materials constituting the component (A).

When the amount of the inorganic filler or the inorganic pigment of the component (B) is less than 0.01 weight parts, the coloring is not made satisfactorily. When the amount of the inorganic filler or the inorganic pigment is more than 50 weight parts, mechanical properties of the material is not increased as expected from the amount even though specific gravity of the material is increased and Izod impact resistance is decreased contrary to the desire. Thus, adverse effects appear while necessity to use an amount more than the specified is not found. When the amount of the organopolysiloxane of the component (C) is less than 0.001 weight parts, the effect of suppressing the decrease of molecular weight of the polycarbonate is small and stability of the process is not enhanced. When the amount of the organopolysiloxane is more than 5 weight parts, the polycarbonate resin composition slides over the screw during the mixing and feeding of the resin becomes unstable. Furthermore, mechanical properties, such as strength and stiffness, may be decreased. Thus, amounts out of the specified ranges are not preferable.

Various kinds of additives or other kinds of synthetic resins can be mixed in the resin composition of the present invention as the component (D) according to necessity within the range that they do not show adverse effect on the object of the present invention.

Examples of such additives are: antioxidants, such as hindered phenols, esters of phosphorous acid, esters of phosphoric acid and the like; ultraviolet light absorbents, such as benzotriazoles, benzophenones and the like; light stabilizers, such as hindered amines and the like; internal lubricants, such as aliphatic carboxylic acid esters, paraffin, silicone oil, polyethylene wax and the like; and flame retardants, flame retarding auxiliary agents, antistatic agents, coloring agents and the like of conventional types.

As the hindered phenol antioxidant described above, BHT (2,6-di-tert-butyl-p-cresol), Irganox 1076 and Irganox 1010 produced by Ciba Geigy Co., Ethyl 330 produced by Ethyl Co., Sumilizer GM produced by Sumitomo Chemical Co., Ltd., and the like are preferably used.

Examples of the other kind of synthetic resin are various kinds of resins other than those of the component (A), such as, polyethylene, polypropylene, polymethyl methacrylate, polystyrene and the like.

The resin composition of the present invention can be obtained by compounding and mixing the components (A), (B) and (C). The component (D) may also be mixed together with these components according to necessity. Further, a combined material prepared by coating the component (C) on the surface of the component (B) may be used according to necessity.

For the compounding and the mixing, conventional methods, for example, methods using a ribbon blender, a Henschel mixer, a Banbury mixer, a drum tumbler, a single-screw extruder, a twin-screw extruder, a cok-neader, a multi-screw extruder or the like, can be adopted. Temperature during the mixing is generally selected in the range of 250° to 300° C.

The polycarbonate resin composition thus obtained can be adopted in various kinds of conventional methods of molding, such as injection molding, blow molding, extrusion molding, compression molding, calender molding, rotation molding and the like, and served to provide various kinds of molded articles.

The invention will be understood more readily with reference to the following examples and comparative examples; however, these examples are intended to illustrate the invention and are not to be construed to limit the scope of the invention.

Example of Preparation 1-1

[Preparation of polydimethylsiloxane having an alkoxysilyl group in the side chain of the molecule]

To a 1 liter round bottom flask equipped with a stirrer, a reflux condenser and a thermometer, 151 g of hexamethyldisiloxane, 482 g of octamethylcyclotetrasiloxane, 167 g of tetramethylcyclotetrasiloxane and 3.0 g of active clay were charged and heated by a mantle heater at 60° C. for 8 hours under stirring. After the mixture was cooled off, it was filtered to obtain 760 g of a colorless transparent oily product.

Structure of the oily product thus obtained was determined as following by the NMR measurement:

$$Me_3SiO(SiO)_7(SiO)_3SiMe_3, \quad Me: methyl\ group.$$
with Me, Me substituents on first block and Me, Me on second block.

Then, into a 500 milliliter round bottom flask equipped with a stirrer, a reflux condenser and a thermometer, 247 g of the oily product obtained above, 153 g of vinyltrimethoxysilane and 0.15 g of a 3% alcohol solution of a chloroplatinic acid were charged and heated by a mantle heater at 80° C. for 4 hours under stirring. The excess amount of vinyltrimethoxysilane was removed from the reaction product by distillation at 120° C. under the vacuum of 30 mm Hg. The residual part was filtered and 363 g of a light brown transparent oily product was obtained.

Structure of the oily product thus obtained was determined as following by the NMR measurement (Kind I):

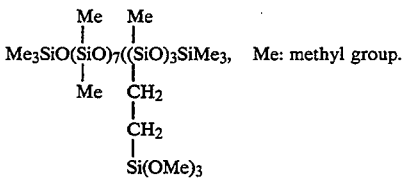

Example of Preparation 1-2

[Preparation of polydimethylsiloxane having an alkoxysilyl group in the side chain of the molecule]

To a 1 liter round bottom flask equipped with a stirrer, a reflux condenser and a thermometer, 28 g of hexamethyldisiloxane, 700 g of octamethylcyclotetrasiloxane, 72 g of tetramethylcyclotetrasiloxane and 3.0 g of active clay were charged and heated by a mantle heater at 60° C. for 8 hours under stirring. After the mixture was cooled off, it was filtered to obtain 744 g of a colorless transparent oily product.

Structure of the oily product thus obtained was determined as following by the NMR measurement:

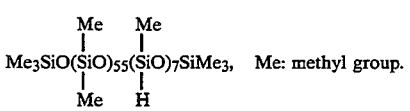

Then, into a 500 milliliter round bottom flask equipped with a stirrer, a reflux condenser and a thermometer, 316 g of the oily product obtained above, 84 g of vinyltrimethoxysilane and 0.15 g of a 3% alcohol solution of a chloroplatinic acid were charged and heated by a mantle heater at 80° C. for 4 hours under stirring. The excess amount of vinyltrimethoxysilane was removed from the reaction product by distillation at 120° C. under the vacuum of 30 mm Hg. The residual part was filtered and 367 g of a light brown transparent oily product was obtained.

Structure of the oily product thus obtained was determined as following by the NMR measurement (Kind II):

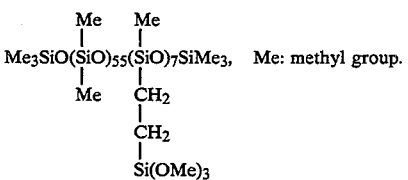

Example of Preparation 1-3

[Preparation of polydimethylsiloxane having an alkoxysilyl group at the both ends of the molecule]

To a 1 liter round bottom flask equipped with a stirrer, a reflux condenser and a thermometer, 92 g of tetramethyldisiloxane, 708 g of octamethylcyclotetrasiloxane and 3.0 g of active clay were charged and heated by a mantle heater at 60° C. for 8 hours under stirring. After the mixture was cooled off, it was filtered to obtain 760 g of a colorless transparent oily product.

Structure of the oily product thus obtained was determined as following by the NMR measurement:

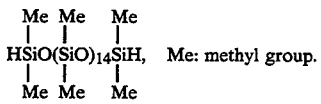

Then, into a 500 milliliter round bottom flask equipped with a stirrer, a reflux condenser and a thermometer, 307 g of the oily product obtained above, 73 g of vinyltrimethoxysilane and 0.15 g of a 3% alcohol solution of a chloroplatinic acid were charged and heated by a mantle heater at 80° C. for 4 hours under stirring. The excess amount of vinyltrimethoxysilane was removed from the reaction product by distillation at 120° C. under the vacuum of 30 mm Hg. The residual part was filtered and 365 g of a light brown transparent oily product was obtained.

Structure of the oily product thus obtained was determined as following by the NMR measurement (Kind III):

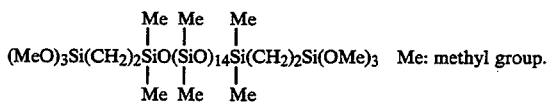

Example of Preparation 1-4

[Preparation of polydimethylsiloxane having an alkoxysilyl group at the both ends of the molecule]

Into a 500 milliliter round bottom flask equipped with a stirrer, a reflux condenser and a thermometer, 307 g of the oily product obtained in Example of Preparation 1-3, 128 g of hexenyltrimethoxysilane and 0.15 g of a 3% alcohol solution of a chloroplatinic acid were charged and heated by a mantle heater at 80° C. for 4 hours under stirring. The excess amount of vinyltrimethoxysilane was removed from the reaction product by distillation at 120° C. under the vacuum of 30 mm Hg. The residual part was filtered and 371 g of a light brown transparent oily product was obtained.

Structure of the oily product thus obtained was determined as following by the NMR measurement (Kind IV):

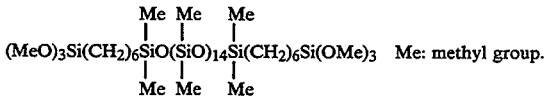

Example of Preparation 2-1

[Preparation of a polycarbonate oligomer (a PC oligomer)]

To 400 liter of a 5% aqueous solution of sodium hydroxide, 60 kg of bisphenol A was dissolved to prepare an aqueous sodium hydroxide solution of bisphenol A. Through a tubular reactor having 10 mm inner diameter and 10 m length, the aqueous sodium hydroxide solution of bisphenol A prepared above and kept at the room temperature and methylene chloride were passed at the speed of 138 liter/hr and 69 liter/hr, respectively, via an orifice plate. In parallel with these streams, phosgen was passed through the reactor at the speed of 10.7 kg/hr. The reaction was kept for 3 hours continuously. The tubular reactor had the structure of double tubes and cooling water was passed through the jacket part to keep the discharge temperature of the reaction solution at 25° C. The value of pH of the discharged solution was controlled in the range of 10 to 11. The reaction solution thus obtained was left standing. Then, the separated water phase was removed and the methylene chloride phase (220 liter) was taken. Methylene chloride was removed by evaporation to obtain a PC oligomer of flake form. Degree of polymerization of the PC oligomer obtained here was 3 to 4.

Example of Preparation 2-2

[Synthesis of a reactive polydimethylsiloxane (PDMS)]

Octamethylcyclotetrasiloxane in an amount of 1483 g, 18.1 g of 1,1,3,3-tetramethyldisiloxane and 35 g of 86% sulfuric acid were mixed together and the mixture was stirred for 17 hour at the room temperature. Then, the oil phase was separated and 25 g of sodium hydrogen carbonate was added to the separated oil phase. The mixture was stirred for 1 hour. After filtration, the reaction solution was distilled in vacuum of 3 torr at 150° C. to remove low boiling point components.

To a mixture of 60 g of 2-allylphenol and 0.0014 g of platinum in the form of a complex compound of platinum chloride and an alcoholate, 294 g of the oily product obtained above was added at the temperature of 90° C. The mixture was stirred for 3 hours while it was kept at the temperature of 90° to 115° C. The reaction product was extracted with methylene chloride and the extract was washed with an 80% aqueous methanol 3 times to remove excess amount of 2-allylphenol. The product was dried with anhydrous sodium sulfate and then the solvent was removed in vacuum by heating up to the temperature of 115° C.

The PDMS terminated with phenol was found to have 150 repeating units of dimethylsilanoxy group by the NMR measurement.

Example of Preparation 2-3

[Preparation of a polycarbonate-polydimethylsiloxane (PC-PDMS) copolymer]

The reactive PDMS obtained in Example of Preparation 2-2 in an amount of 185 g was dissolved into 2 liter of methylene chloride and the solution was mixed with 10 liter of the PC oligomer obtained in Example of Preparation 2-1. To this solution, a solution prepared by dissolving 26 g of sodium hydroxide in 1 liter of water and 5.7 cc of triethylamine were added and the mixture was kept stirring for 1 hour at the room temperature at 500 rpm. Then, a solution prepared by dissolving 600 g of bisphenol A in 5 liter of a 5.2 weight % aqueous sodium hydroxide solution, 8 liter of methylene chloride and 81 g of p-tert-butylphenol were added and the mixture was kept stirring for 2 hours at the room temperature at 500 rpm. After the stirring, 5 liter of methylene chloride was added and the solution was washed with water by using 5 liter of water, with an alkali by using 5 liter of a 0.01N aqueous sodium hydroxide solution, with an acid by using 5 liter of 0.1N aqueous solution of hydrochloric acid and with water by using 5 liter of water, successively. Finally, methylene chloride was removed to obtain a PC-PDMS copolymer of chip form.

The PC-PDMS copolymer obtained here had $M_v$ (viscosity average molecular weight) of 20,000, chain length of PDMS (n: dimethylsilanoxy unit) of 150 and content of PDMS of 4 weight %.

Measurements of the viscosity average molecular weight ($M_v$), the chain length of PDMS (n: dimethylsilanoxy unit) and the content of PDMS were conducted according to the following methods:

1) Viscosity average molecular weight ($M_v$)

A molded product was pulverized and dissolved into methylene chloride. The insoluble fraction was removed by filtration and a film was formed from the solution by evaporation of the solvent. The film formed was dissolved in methylene chloride again and viscosity of the solution thus obtained was measured by using an Ubelhode viscometer at 20 C. to obtain intrinsic viscosity $[\eta]$. Viscosity average molecular weight was obtained from the intrinsic viscosity by the following equation:

$$[\eta] = 1.23 \times 10^{-5} M_v^{0.83}$$

2) Chain length of PDMS (n: number of dimethylsilanoxy unit)

Chain length of PDMS was obtained from ratio of the peak of methyl group of dimethylsiloxane observed at 0.2 ppm and the peak of methylene group of PC-PDMS linkage part observed at 2.6 ppm in $^1$H-NMR.

3) Content of PDMS

Content of PDMS was obtained from ratio of the peak of methyl group in isopropyl group of bisphenol A observed at 1.7 ppm and the peak of methyl group of dimethylsiloxane observed at 0.2 ppm in $^1$H-NMR.

Examples 1A to 14A and Comparative Examples 1A to 14A

Components were dry blended in the amounts shown in Table 1A and mixed at 260° C. by using a single-screw extruder having a vent (a product of Nakatani Kikai Co., Ltd., NVC-50) to prepare pellets.

The pellets thus obtained were dried at 120° C. for 8 hours and injection molded at the molding temperature of 280° C. and the mold temperature of 80° C. to prepare test pieces.

For evaluation of quality of the test pieces, Izod impact strength and degree of whiteness were measured. Flow value was measured by using the pellets. The test pieces were pulverized and viscosity average molecular weight ($M_v$) was measured. Then, difference of the viscosity average molecular weight obtained here and the viscosity average molecular weight of the material polycarbonate ($\Delta M_v$) was obtained. Results are shown in Table 2A.

Materials used in the Examples and the Comparative Examples are as following.

(A) Polycarbonate resin
  Toughlon A2500 [a product of Idemitsu Petrochemical Co., Ltd.; $M_v = 24000$]
  Toughlon A1900 [a product of Idemitsu Petrochemical Co., Ltd.; $M_v = 1900$]
  PC-PDMS copolymer [Example of Preparation 2-3]
  Toughlon IB2500 [a product of Idemitsu Petrochemical Co., Ltd.; a branched polycarbonate]

(B) Titanium oxide
  CR-60 [a product of Ishihara Sangyo Kaisha, Ltd.], surface treatment with hydrated aluminum.

(C) Organopolysiloxane
  [Products of Dow Corning Toray Silicone Co., Ltd.]
  1) Kind I (Example of Preparation 1-1) content of methoxy group, 21.4 weight %; viscosity, 20 cSt
  2) Kind II (Example of Preparation 1-2) content of methoxy group, 11.4 weight %; viscosity, 85 cSt
  3) Kind III (Example of Preparation 1-3) content of methoxy group, 12.7 weight %; viscosity, 15 cSt
  4) Kind IV (Example of Preparation 1-4) content of methoxy group, 11.8 weight %; viscosity, 20 cSt
  5) SH200 (dimethylpolysiloxane) viscosity, 20 cSt
  6) SH550 (methylphenylpolysiloxane) viscosity, 130 cSt Measurements for evaluation of quality were conducted according to the following methods.

1) Izod impact strength

Izod impact strength was measured according to the method of Japanese Industrial Standard K-7110; ⅛ inch thickness and at 23° C.

2) Degree of whiteness

Degree of whiteness is shown by Hunter Lab degree of whiteness [W(Lab)], which is obtained by the following equation of definition:

$$W(\%) = 100 - [(100-L)^2 + (a^2+b^2)]^{\frac{1}{2}},$$

wherein L, a and b are lightness (L), and perceived chromaticity indices (a and b), respectively, in the Lab chromaticity coordinate.

3) Viscosity average molecular weight ($M_v$)

The same as that described above.

4) Flow value

Flow value was measured according to the method of Japanese Industrial Standard K-7210. Measurement was made at the temperature of 280° C. under the load of 160 kg.

TABLE 1A

| | polycarbonate | | titanium oxide | organo-polysiloxane | |
|---|---|---|---|---|---|
| | kind | amount (wt. part) | amount (wt. part) | kind | amount (wt. part) |
| Example 1A | A2500 | 100 | 10 | I | 0.5 |
| Example 2A | A2500 | 100 | 10 | II | 0.5 |
| Example 3A | A2500 | 100 | 10 | III | 0.5 |
| Example 4A | A2500 | 100 | 10 | IV | 0.5 |
| Example 5A | A2500 | 100 | 10 | I | 0.3 |
| Example 6A | A1900 | 100 | 10 | I | 0.5 |
| Example 7A | A1900 | 100 | 10 | III | 0.5 |
| Example 8A | A2500 | 100 | 0.5 | I | 0.05 |
| Example 9A | A2500 | 100 | 0.5 | III | 0.05 |
| Example 10A | A2500 | 100 | 2.5 | I | 0.15 |
| Example 11A | A2500 | 100 | 5 | I | 0.25 |
| Example 12A | A2500 | 100 | 15 | I | 0.75 |
| Example 13A | PC-PDMS | 100 | 10 | I | 0.5 |
| Example 14A | IB2500 | 100 | 10 | I | 0.5 |
| Comparative Example 1A | A2500 | 100 | 0.5 | — | — |
| Comparative Example 2A | A2500 | 100 | 2.5 | — | — |
| Comparative Example 3A | A2500 | 100 | 5 | — | — |
| Comparative Example 4A | A2500 | 100 | 10 | — | — |
| Comparative Example 5A | A2500 | 100 | 15 | — | — |
| Comparative Example 6A | A2500 | 100 | 10 | SH200 | 0.5 |
| Comparative Example 7A | A2500 | 100 | 10 | SH550 | 0.5 |
| Comparative Example 8A | A2500 | 100 | 2.5 | SH200 | 0.15 |
| Comparative Example 9A | A2500 | 100 | 2.5 | SH550 | 0.15 |
| Comparative Example 10A | A1900 | 100 | 0.5 | — | — |
| Comparative Example 11A | A1900 | 100 | 2.5 | — | — |
| Comparative Example 12A | A1900 | 100 | 10 | — | — |
| Comparative | A2500 | 100 | — | I | 0.5 |

TABLE 1A-continued

| | polycarbonate | | titanium oxide | organo-polysiloxane | |
|---|---|---|---|---|---|
| | kind | amount (wt. part) | amount (wt. part) | kind | amount (wt. part) |
| Example 13A Comparative Example 14A | A2500 | 100 | — | I | 0.3 |

TABLE 2A

| | degree of whiteness (%) | Izod impact strength | $\Delta M_v$ | flow value ml/sec |
|---|---|---|---|---|
| Example 1A | 96.2 | 75 | 800 | $3.8 \times 10^{-2}$ |
| Example 2A | 93.1 | 50 | 1,500 | $5.0 \times 10^{-2}$ |
| Example 3A | 93.5 | 63 | 1,100 | $4.0 \times 10^{-2}$ |
| Example 4A | 93.4 | 55 | 1,300 | $4.7 \times 10^{-2}$ |
| Example 5A | 94.7 | 65 | 1,200 | $4.3 \times 10^{-2}$ |
| Example 6A | 95.7 | 60 | 500 | $10.0 \times 10^{-2}$ |
| Example 7A | 93.2 | 50 | 1,300 | $11.5 \times 10^{-2}$ |
| Example 8A | 89.3 | 90 | 400 | $3.3 \times 10^{-2}$ |
| Example 9A | 88.1 | 85 | 600 | $3.5 \times 10^{-2}$ |
| Example 10A | 91.4 | 85 | 700 | $3.7 \times 10^{-2}$ |
| Example 11A | 94.2 | 75 | 600 | $3.8 \times 10^{-2}$ |
| Example 12A | 96.0 | 68 | 900 | $3.9 \times 10^{-2}$ |
| Example 13A | 97.1 | 75 | 600 | $9.0 \times 10^{-2}$ |
| Example 14A | 94.6 | 70 | 1,000 | $2.0 \times 10^{-2}$ |
| Comparative Example 1A | 85.5 | 82 | 1,200 | $5.2 \times 10^{-2}$ |
| Comparative Example 2A | 89.0 | 70 | 3,300 | $9.7 \times 10^{-2}$ |
| Comparative Example 3A | 89.9 | 52 | 5,400 | $15.0 \times 10^{-2}$ |
| Comparative Example 4A | 91.1 | 6 | 10,000 | $39.0 \times 10^{-2}$ |
| Comparative Example 5A | 91.4 | 4 | 12,000 | $54.5 \times 10^{-2}$ |
| Comparative Example 6A | 91.8 | 7 | 9,000 | $37.0 \times 10^{-2}$ |
| Comparative Example 7A | 91.4 | 5 | 9,500 | $38.5 \times 10^{-2}$ |
| Comparative Example 8A | 89.5 | 60 | 3,000 | $9.5 \times 10^{-2}$ |
| Comparative Example 9A | 87.5 | 58 | 3,600 | $10.0 \times 10^{-2}$ |
| Comparative Example 10A | 85.0 | 55 | 1,000 | $12.0 \times 10^{-2}$ |
| Comparative Example 11A | 88.0 | 40 | 2,500 | $23.0 \times 10^{-2}$ |
| Comparative Example 12A | 91.0 | 4 | 7,000 | $45.0 \times 10^{-2}$ |
| Comparative Example 13A | 60.2 | 93 | 300 | $3.1 \times 10^{-2}$ |
| Comparative Example 14A | 58.3 | 94 | 300 | $3.1 \times 10^{-2}$ |

Notes:
Izod impact strength (23° C.): (kJ/m²)
$\Delta M_v$: difference of viscosity average molecular weights of the material PC and the molded PC; a smaller value shows less degree of degradation.

Examples 1B to 8B and Comparative Examples 1B to 4B

Components were dry blended in the amounts shown in Table 1B and mixed at 260° C. by using a single-screw extruder having a vent (a product of Nakatani Kikai Co., Ltd., NVC-50) to prepare pellets. The pellets thus obtained were dried at 120° C. for 8 hours and injection molded at the molding temperature of 280° C. and the mold temperature of 80° C. to prepare test pieces.

For evaluation of quality of the test pieces obtained in the Examples and the Comparative Examples, Izod impact strength was measured and appearance was evaluated by visual observation of change of color tone. The test pieces were pulverized and viscosity average molecular weight ($M_v$) was measured. Flow value of pellets was also measured. Results are shown in Table 2B.

Materials used in the Examples and the Comparative Examples are as following.

(A) Polycarbonate resin (PC)
Toughlon A2500 [a product of Idemitsu Petrochemical Co., Ltd.; $M_v = 23,500$]
PC-PDMS copolymer [Example of Preparation 2-3]
Toughlon IB2500 [a product of Idemitsu Petrochemical Co., Ltd.; a branched polycarbonate]

(B) Inorganic filler
Talc: SWA (diameter of platelets, about 10 μm) [a product of Asada Milling Co., Ltd.]
Mica: M-325 (diameter of platelets, about 18 μm) [a product of Repco Co., Ltd.]
Whisker: potassium titanate whisker D102 [a product of Otsuka Chemical Co., Ltd.]

(C) Glass powder
Average particle diameter, about 70 μm.

(D) Organopolysiloxane
The same as those described above.

Measurements for evaluation of quality were conducted according to the following methods.

1) Viscosity average molecular weight ($M_v$): the same as that described above.
2) Flow value: the same as that described above.
3) Izod impact resistance: the same as that described above.
4) Appearance Appearance was evaluated by visual observation of change of color tone according to the following criterion.

○: Change of color tone was small.
Δ: Change of color tone was medium.
X: Change of color tone was large.

TABLE 1B

| | PC amount (wt. part) | inorganic filler kind | amount (wt. part) | organo-polysiloxane kind | amount (wt. part) |
|---|---|---|---|---|---|
| Example 1B | 100 | talc | 10 | I | 0.5 |
| Example 2B | 100 | mica | 10 | I | 0.5 |
| Example 3B | 100 | whisker | 10 | I | 0.5 |
| Example 4B | 100 | talc | 10 | II | 1.0 |
| Example 5B | 100 | talc | 25 | III | 2.0 |
| Example 6B | 100 | talc | 10 | I | 0.5 |
| Example 7B | 100 | mica | 10 | I | 0.5 |
| Example 8B | 100 | glass powder | 10 | I | 0.5 |
| Comparative Example 1B | 100 | talc | 10 | — | — |
| Comparative Example 2B | 100 | mica | 10 | — | — |
| Comparative Example 3B | 100 | whisker | 10 | — | — |
| Comparative Example 4B | 100 | glass powder | 10 | — | — |

Notes:
PC in Examples 1B to 5B: A2500
PC in Example 6B: PC-PDMS copolymer
PC in Example 7B: IB2500
PC in Example 8B: A2500
PC in Comparative Examples 1B to 4B: A2500

TABLE 2B

| | viscosity average molecular weight | | flow value (ml/sec) | Izod impact strength (kJ/m²) | appearance |
|---|---|---|---|---|---|
| | pellets | molded product | | | |
| Example 1B | 21,000 | 20,700 | $4.2 \times 10^{-2}$ | 9 | ○ |
| Example 2B | 23,000 | 21,200 | $3.9 \times 10^{-2}$ | 12 | ○ |
| Example 3B | 19,200 | 15,900 | $10.8 \times 10^{-2}$ | 10 | Δ |

TABLE 2B-continued

| | viscosity average molecular weight | | flow value (ml/sec) | Izod impact strength (kJ/m²) | appearance |
|---|---|---|---|---|---|
| | pellets | molded product | | | |
| Example 4B | 20,500 | 20,000 | $5.0 \times 10^{-2}$ | 8 | o |
| Example 5B | 19,800 | 19,000 | $6.0 \times 10^{-2}$ | 9 | o |
| Example 6B | 19,200 | 18,800 | $5.0 \times 10^{-2}$ | 13 | o |
| Example 7B | 25,000 | 24,200 | $2.0 \times 10^{-2}$ | 12 | o |
| Example 8B | 23,000 | 22,500 | $3.0 \times 10^{-2}$ | 10 | o |
| Comparative Example 1B | 18,100 | 8,050 | $110 \times 10^{-2}$ | 2 | x |
| Comparative Example 2B | 19,800 | 15,400 | $13.4 \times 10^{-2}$ | 4 | Δ~x |
| Comparative Example 3B | 12,800 | molding not possible | $66.2 \times 10^{-2}$ | — | — |
| Comparative Example 4B | 21,000 | 19,100 | $6.1 \times 10^{-2}$ | 7 | Δ |

Note: Izod impact strength was measured with a notch.

Examples 1C to 8C and Comparative Examples 1C to 6C

Components were dry blended in the amounts shown in Table 1C and mixed at 280° to 300° C. by using a 40ϕ single-screw extruder having a vent (a product of Tanabe Plastics Kikai Co., Ltd.) to prepare pellets.

The pellets thus obtained were dried at 120° C. for 8 hours and injection molded [a molding machine produced by Toshiba Kikai Co., Ltd., IS45P; mold: 3 stage plates of 1 piece a plate, for color adjustment]at the molding temperature of 280° C. to prepare test pieces.

For evaluation of quality of the test pieces obtained in the Examples and the Comparative Examples, color tone of the molded products was checked. The pellets and the test pieces were pulverized and viscosity average molecular weight ($M_v$) was measured. Results are shown in Table 2C.

Materials used in the Examples and the Comparative Examples are as following.
(A) Polycarbonate (PC)
   Toughlon A2500 [a product of Idemitsu Petrochemical Co., Ltd.; $M_v$=24,200]
(B) Inorganic pigments
   $B_1$: iron oxide, Bayferrox 140M (a product of Bayer Co.)
   $B_2$: ultramarine blue, Ultramarine Blue #1500 (a product of Daiichi Kasei Co., Ltd.)
   $B_3$: pearl mica, Iriodin 100 Silver Pearl (a product of Merck Co.)
   $B_4$: carbon black, Carbon Black #850 (a product of Mitsubishi Kasei Co.)
   $B_5$: calcium carbonate, SHIPRON A (a product of SHIPRO KASEI Co., Ltd.)
(C) Organopolysiloxane
   The same as those described above.

Measurements for evaluation of quality were conducted according to the following methods.
1) Viscosity average molecular weight ($M_v$): the same as that described above.
2) Color tone of a molded product
Color tone of a molded product was measured according to the method of Japanese Industrial Standard K-7105.
(1) CIE 1976 L*a*b* (light source D): L* is an index showing lightness and a* and b* are psychometric chroma coordinates.
A positive value of a* shows reddish color tone.
A negative value of a* shows greenish color tone.
A positive value of b* shows yellowish color tone.
A negative value of b* shows bluish color tone.
(2)YI (yellow index)

TABLE 1C

| | PC amount (wt. part) | inorganic pigment | | organopolysiloxane | |
|---|---|---|---|---|---|
| | | kind | amount (wt. part) | kind | amount (wt. part) |
| Example 1C | 100 | $B_2$ | 0.8 | I | 0.04 |
| Example 2C | 100 | $B_1$ | 1.6 | I | 0.08 |
| Example 3C | 100 | $B_2$ | 1.6 | I | 0.08 |
| Example 4C | 100 | $B_3$ | 1.6 | I | 0.08 |
| Example 5C | 100 | $B_2$ | 1.6 | II | 0.08 |
| Example 6C | 100 | $B_2$ | 1.6 | III | 0.08 |
| Example 7C | 100 | $B_4$ | 1.6 | I | 0.08 |
| Example 8C | 100 | $B_5$ | 1.6 | I | 0.08 |
| Comparative Example 1C | 100 | $B_2$ | 0.8 | — | — |
| Comparative Example 2C | 100 | $B_1$ | 1.6 | — | — |
| Comparative Example 3C | 100 | $B_2$ | 1.6 | — | — |
| Comparative Example 4C | 100 | $B_3$ | 1.6 | — | — |
| Comparative Example 5C | 100 | $B_4$ | 1.6 | — | — |
| Comparative Example 6C | 100 | $B_5$ | 1.6 | — | — |
| Comparative Example 7C | 100 | $B_2$ | 1.6 | SH200 | 0.08 |

TABLE 2C

| | viscosity average molecular weight $M_v$ | | color tone | | | |
|---|---|---|---|---|---|---|
| | pellets | molded product | YI | L* | a* | b* |
| Example 1C | 23,300 | 22,000 | −52.9 | 28.1 | 3.9 | −12.8 |
| Example 2C | 23,300 | 22,800 | 91.5 | 32.3 | 23.0 | 13.6 |
| Example 3C | 22,100 | 21,300 | −26.4 | 27.8 | 1.9 | −7.6 |
| Example 4C | 23,400 | 22,500 | 8.7 | 83.2 | −1.0 | 1.0 |
| Example 5C | 22,000 | 21,000 | −26.0 | 27.8 | 1.8 | −7.4 |
| Example 6C | 22,200 | 21,000 | −26.1 | 27.8 | 1.8 | −7.5 |
| Example 7C | 22,900 | 22,700 | 2.0 | 27.9 | −0.2 | −1.1 |
| Example 8C | 22,600 | 20,600 | 3.2 | 37.0 | −0.4 | −1.0 |
| Comparative Example 1C | 20,800 | 19,000 | −49.0 | 28.1 | 3.6 | −12.1 |
| Comparative Example 2C | 22,400 | 20,800 | 89.7 | 37.1 | 22.4 | 13.3 |
| Comparative Example 3C | 17,700 | 16,000 | −24.5 | 27.7 | 1.8 | −7.1 |
| Comparative Example 4C | 23,200 | 18,600 | 17.3 | 81.3 | −1.1 | 5.4 |
| Comparative Example 5C | 22,200 | 21,000 | 1.9 | 27.8 | −0.2 | −1.1 |
| Comparative Example 6C | 21,700 | 17,000 | 8.8 | 34.8 | −0.3 | 0.4 |
| Comparative Example 7C | 18,200 | 16,200 | −24.0 | 27.6 | 1.7 | −7.0 |

Examples 1D to 7D and Comparative Examples 1D to 5D

Components were dry blended in the amounts shown in Table 1D and mixed at 260° C. by using a single-screw extruder having a vent (a product of Nakatani Kikai Co., Ltd., NVC) to prepare pellets. Polycarbonate resins and thermoplastic polyester resins had been dried at 120° C. for 12 hours.

The pellets thus obtained were dried at 120° C. for 12 hours and injection molded at the molding temperature of 280° C. by using an injection molding machine having a bent, IS100E-N, (a product of Toshiba Kikai Co., Ltd.) to prepare test pieces.

For evaluation of quality of the test pieces obtained in the Examples and the Comparative Examples, bending modulus was measured. For evaluation of the pellets, heat stability and flow value were measured. Results are shown in Table 2D.

Materials used in the Examples and the Comparative Examples are as following.

(A) Polycarbonate resin
 Toughlon A2200 [a product of Idemitsu Petrochemical Co., Ltd.], $M_v=22,200$
 Thermoplastic polyester resin
 $A_1$: polyethylene terephthalate (PET) MA-523VX [a product of Mitsubishi Rayon Co., Ltd.]
 $A_2$: polybutylene terephthalate (PBT) N1000 [a product of Mitsubishi Rayon Co., Ltd.]
 Rubbery elastomer
 $A_3$: MAS resin S-2001 [a product of Mitsubishi Rayon Co., Ltd.]

(B) Inorganic filler or inorganic pigment
 $B_1$: talc, FFR [a product of Asada Milling Co., Ltd.]
 $B_2$: mica, M-325 [a product of Repco Co.]
 $B_3$: mica, M-60 [a product of Repco Co.]
 $B_4$: titanium oxide, CR-60 [a product of Ishihara Sangyo Kaisha, Ltd.]

(C) Organopolysiloxane
 The same as those described above.

Measurements of heat stability, flow value and bending modulus were conducted according to the following methods.

1) Heat stability

The pellets obtained were kept in a capillary rheometer at 300° C. for 10 minutes and then extruded. Appearance of the extruded strand was visually observed for evaluation.

Criterion of evaluation:
⊙: no yellow skin or rough skin observed
◯: slight yellow skin and rough skin observed
Δ: considerable yellow skin and rough skin observed
×: a large extent of yellow skin and rough skin observed 2) Flow value
The same as that described above.

3) Bending modulus
Bending modulus was measured according to the method of Japanese Industrial Standard K-7203.

TABLE 1D

| | Composition of the Compound (weight part) | | | | |
|---|---|---|---|---|---|
| | PC amount | polyester resin kind | polyester resin amount | rubbery elastomer kind | rubbery elastomer amount |
| Example 1D | 70 | $A_1$ | 30 | — | — |
| Example 2D | 70 | $A_2$ | 30 | — | — |
| Example 3D | 70 | $A_1$ | 30 | — | — |
| Example 4D | 70 | $A_1$ | 30 | — | — |
| Example 5D | 70 | $A_1$ | 25 | $A_3$ | 5 |
| Example 6D | 70 | $A_1$ | 30 | — | — |
| Example 7D | 80 | $A_1$ | 20 | — | — |
| Comparative Example 1D | 70 | $A_1$ | 30 | — | — |
| Comparative Example 2D | 70 | $A_1$ | 30 | — | — |
| Comparative Example 3D | 70 | $A_1$ | 30 | — | — |
| Comparative Example 4D | 70 | $A_1$ | 30 | — | — |
| Comparative Example 5D | 80 | $A_1$ | 20 | — | — |

| | inorganic filler* | | organopolysiloxane | |
|---|---|---|---|---|
| | kind | amount | kind | amount |
| Example 1D | $B_1$ | 10 | I | 0.5 |
| Example 2D | $B_1$ | 10 | I | 0.5 |
| Example 3D | $B_2$ | 10 | I | 0.5 |
| Example 4D | $B_3$ | 10 | I | 0.5 |
| Example 5D | $B_1$ | 10 | I | 0.5 |
| Example 6D | $B_1$ | 25 | I | 1.0 |
| Example 7D | $B_4$ | 1 | I | 0.1 |
| Comparative Example 1D | $B_1$ | 10 | — | — |
| Comparative Example 2D | $B_1$ | 25 | — | — |
| Comparative Example 3D | $B_1$ | 10 | SH200 | 0.5 |
| Comparative Example 4D | $B_2$ | 10 | SH200 | 0.5 |
| Comparative Example 5D | $B_4$ | 1 | — | — |

*Including inorganic pigments.

TABLE 2D

| | heat stability (capillary) | flow value (ml/sec) | bending modulus (kg²/cm²) |
|---|---|---|---|
| Example 1D | ⊙ | $10.0 \times 10^{-2}$ | 33,000 |
| Example 2D | ⊙ | $16.0 \times 10^{-2}$ | 35,000 |
| Example 3D | ⊙ | $9.5 \times 10^{-2}$ | 36,000 |
| Example 4D | ⊙ | $9.5 \times 10^{-2}$ | 38,000 |
| Example 5D | ◯ | $10.5 \times 10^{-2}$ | 30,000 |
| Example 6D | ◯ | $6.5 \times 10^{-2}$ | 43,000 |
| Example 7D | ⊙ | $8.5 \times 10^{-2}$ | 30,000 |
| Comparative Example 1D | Δ | $12.0 \times 10^{-2}$ | 31,000 |
| Comparative Example 2D | × | $9.0 \times 10^{-2}$ | 40,000 |
| Comparative Example 3D | Δ | $12.5 \times 10^{-2}$ | 31,000 |
| Comparative Example 4D | Δ | $12.0 \times 10^{-2}$ | 34,000 |
| Comparative Example 5D | Δ | $9.5 \times 10^{-2}$ | 30,000 |

As described above, according to the present invention, decrease of molecular weight of polycarbonate resin accompanied with the compounding of inorganic fillers and inorganic pigments is suppressed and the resin composition obtained has an excellent degree of whiteness, color tone corresponding to the proper color tone of a coloring pigment and excellent moldability and provides molded articles having excellent appearance and mechanical properties, such as impact strength. According to the present invention, the decrease of molecular weight is suppressed in the resin composition comprising a polycarbonate resin, a thermoplastic polyester resin, a rubbery elastomer and an inorganic filler or an inorganic pigment, as well, and the resin composition having excellent heat stability can be obtained.

Therefore, the resin composition of the present invention can be applied to production of various kinds of molded articles, such as molded articles in the field of office automation instruments, electric and electronic products, automobiles, mechanical products, building materials and the like.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A polycarbonate resin composition comprising 100 weight parts of (a) a thermoplastic resin comprising a polycarbonate resin as the main component thereof, 0.001 to 50 weight parts of (b) at least one inorganic material selected from the group consisting of inorganic fillers and inorganic pigments and 0.001 to 5 weight parts of (c) an organopolysiloxane having an organoxysilyl group which is bonded to a silicon atom through a divalent hydrocarbon group, the organopolysiloxane being of the formula (IV):

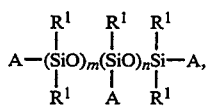   (IV)

wherein $R^1$ is a monovalent hydrocarbon group, A is a monovalent hydrocarbon group; at least one A being a monovalent hydrocarbon group comprising an organoxysilyl group of formula (V):

   (V)

$R^2$ is a divalent hydrocarbon group,
$R^3$ and $R^4$ are each a monovalent hydrocarbon group and x is an integer of 0 to 2,
m is an integer of 1 to 300,
n is an integer of 0 to 300 and
m+n is an integer of 1 to 300.

2. A polycarbonate resin composition as claimed in claim 1, wherein the thermoplastic resin of the component (a) comprises 50 to 95 weight % of a polycarbonate resin, 5 to 50 weight % of a thermoplastic polyester resin and 0 to 45 weight % of a rubbery elastomer.

3. A polycarbonate resin composition as claimed in claim 1, wherein the thermoplastic resin of the component (a) is a polycarbonate resin.

4. A polycarbonate resin composition as claimed in claim 1, wherein the component (b) is an inorganic filler which comprises a group having reactivity with the polycarbonate resin.

5. A polycarbonate resin composition as claimed in claim 4, wherein the inorganic filler of the component (b) is at least one inorganic filler selected from the group consisting of talc, mica and potassium titanate whisker.

6. A polycarbonate resin composition as claimed in claim 1, wherein the component (b) is at least one inorganic pigment selected from iron oxide, ultramarine blue, pearl mica, carbon black and calcium carbonate.

7. A polycarbonate resin composition as claimed in claim 1, wherein the component (b) is an inorganic pigment which is a white pigment.

8. A polycarbonate resin composition as claimed in claim 7, wherein the white pigment is titanium oxide.

9. A polycarbonate resin composition as claimed in claim 1, wherein the polycarbonate has a viscosity average molecular weight of 10,000 to 100,000.

10. A polycarbonate resin composition according to claim 1, wherein the polycarbonate has a viscosity average molecular weight of 15,000 to 40,000.

11. A polycarbonate resin composition according to claim 10, wherein the polycarbonate is of the formula (I)

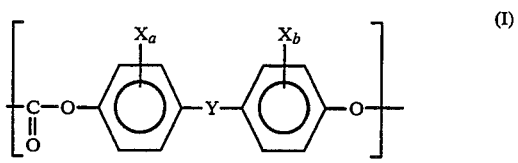   (I)

wherein X is a chlorine atom, a bromine atom, a fluorine atom, an iodine atom, a methyl group, an ethyl group, a propyl group, an n-butyl group, an isobutyl group, an amyl group, an isoamyl group, a hexyl group, and an octyl group; a and b are each an integer of 0 to 4; and Y is a methylene group, an ethylene group, a propylene group, a butylene group, a pentenylene group, a hexylene group, an octylene group, an ethylidene group, an isopropylidene group, a cyclopentylene group, a cyclohexylene group, a cyclopentylidene group, a cyclohexylidene group, —S—, —SO—, —SO$_2$—, —O—, —CO— or a group of the formula (II) or (II'):

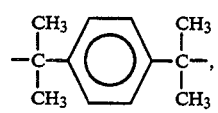   (II)

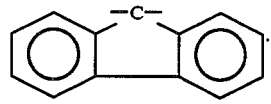   (II')

12. A polycarbonate resin composition as claimed in claim 11, wherein the component (b) is an inorganic material selected from the group consisting of (i) an inorganic filler selected from the group consisting of potassium titanate whiskers, rock wool, glass, carbon fiber, stainless steel fiber, aluminum borate whiskers, silicon nitride whiskers, boron fiber, zinc oxide whiskers, talc, mica, aluminum foil and calcium carbonate; and (ii) an inorganic pigment selected from the group consisting of titanium oxide, zinc oxide, lithopene, zinc sulfate, lead white, iron oxide, ultramarine blue, pearl mica, carbon black, calcium carbonate, molybdenum red, yellow lead, alumina, zinc chromate, chromium oxide, copper phthalocyanine, mineral violet, cobalt blue and cobalt violet.

13. A polycarbonate resin composition as claimed in claim 12, wherein $R^1$, $R^3$ and $R^4$ are each a monovalent group selected from the group consisting of a methyl group, an ethyl group, a propyl group, a butyl group, a pentyl group, a hexyl group, a vinyl group, an allyl group, a butenyl group, a pentenyl group, a hexenyl group, a phenyl group, a tolyl group, a xylyl group, a benzyl group, a phenetyl group, a chloromethyl group, a chloropropyl group and a 3,3,3-trifluoropropyl group; and $R^2$ is a methylmethylene group, an ethylene group, an ethylethylene group, a propylene group or a butylene group.

14. A polycarbonate resin composition as claimed in claim 12, wherein A is a monovalent hydrocarbon group comprising an organoxysilyl group which is selected from the group consisting of a trimethoxysilylethylene group, a triethoxysilylethylene group, a dimethoxyphenoxysilylpropylene group, a trimethoxysilylpropylene group, a trimethoxysilylbutylene group, a methyldimethoxysilylpropylene group and a dimethylmethoxysilylpropylene group.

15. A polycarbonate resin composition as claimed in claim 5, wherein the inorganic filler is an amount of 0.1 to 45 weight parts and the organopolysiloxane is in an amount of 0.01 to 3 weight parts.

16. A polycarbonate resin composition as claimed in claim 6, wherein the inorganic pigment is in an amount of 0.005 to 15 weight parts and the organopolysiloxane is in an amount of 0.01 to 3 weight parts.

17. A polycarbonate resin composition as claimed in claim 1, wherein the component (a) comprises 55 to 90 weight % of a polycarbonate resin, 10 to 45 weight % of a thermoplastic polyester resin and 0 to 40 weight % of a rubbery elastomer; the component (b) is in an amount of 0.05 to 20 weight parts; and the organopolysiloxane is in an amount of 0.005 to 2 weight parts.

* * * * *